Nov. 18, 1952          C. F. PULVARI          2,618,688
ELECTRIC AUTOMATIC CIRCUIT BREAKER WITH RECLOSING MEANS
Filed May 3, 1950          3 Sheets-Sheet 1
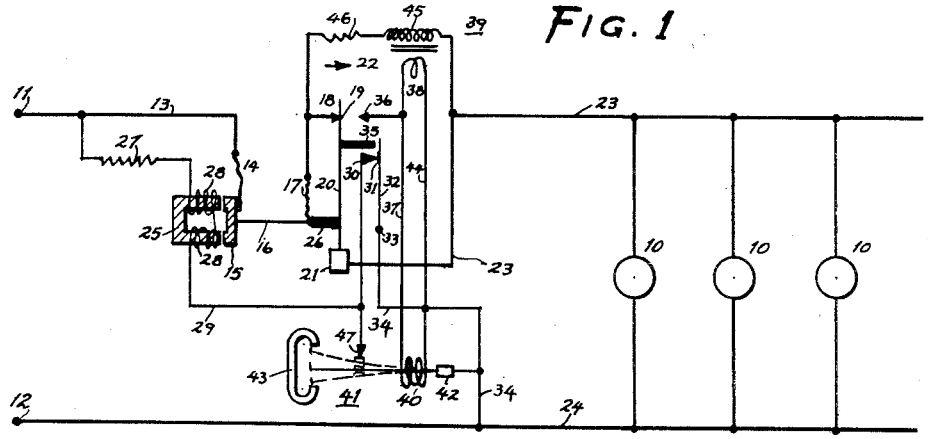
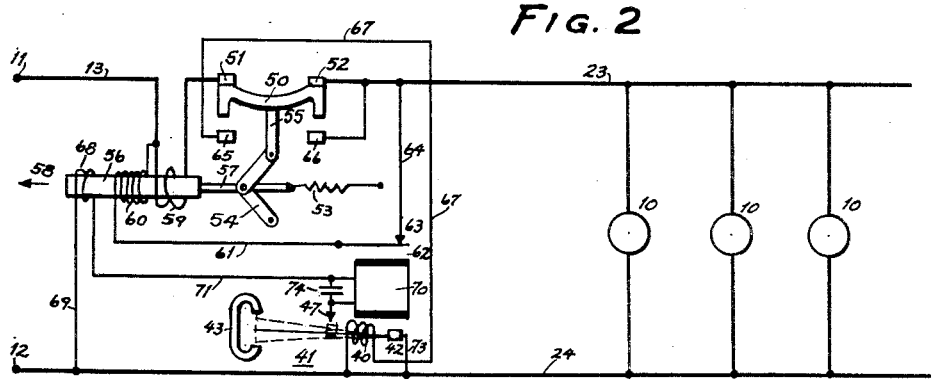
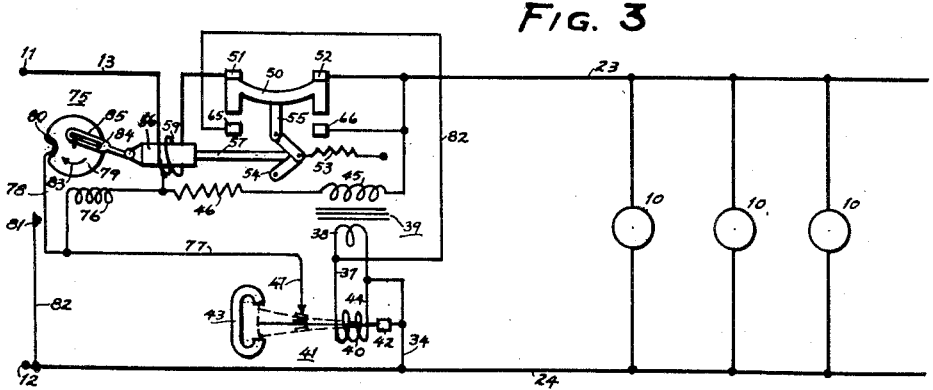
INVENTOR
CHARLES F. PULVARI
BY
PATENT AGENT Nov. 18, 1952    C. F. PULVARI    2,618,688
ELECTRIC AUTOMATIC CIRCUIT BREAKER WITH RECLOSING MEANS
Filed May 3, 1950    3 Sheets-Sheet 2

INVENTOR
CHARLES F. PULVARI
BY
PATENT AGENT

Patented Nov. 18, 1952

2,618,688

UNITED STATES PATENT OFFICE 2,618,688

ELECTRIC AUTOMATIC CIRCUIT BREAKER WITH RECLOSING MEANS

Charles F. Pulvari, Washington, D. C.

Application May 3, 1950, Serial No. 159,789

23 Claims. (Cl. 175—294)

The invention relates to electric devices, such as automatic switches or circuit breakers, in which upon the occurrence of overloads, short-circuits and/or other particular undesired or dangerous conditions, auxiliary circuits become effective. The main or power contacts of such automatic circuit breakers are disconnected and the power circuits automatically interrupted, when overloads or short-circuits occur in the networks. Many of these circuit-breakers have been equipped with electromagnetically operated reclosing devices frequently controlled by electronic discharge tubes, the grids of which have been connected to the network through which low measuring currents flow. In case of an overload or short-circuit, the voltage of the measuring current in the network drops and this voltage drop controls, by means of the electron discharge tube, the reclosing device, said tube acting as amplifier. If the overload or short-circuit in the network has disappeared, the reclosing device is energized to reclose the circuit breaker.

Although these electronically controlled reclosing devices were an improvement over the older reclosing devices using electromagnetic relays requiring rather high measuring currents, the engineers in electric power plants and networks preferred to use apparatus without electronic devices. In addition to this, the matching of the load resistance to a grid of an electron discharge tube is inconvenient due to the great difference in resistance between them.

The inventor has recognized these difficulties and overcome the disadvantages of the reclosing devices heretofore used by providing a simple and sturdy member responsive to measuring alternating currents in a circuit breaker of the reclosing type, whereby no electronic amplification is used. Nevertheless, this simple member responsive to the measuring currents is highly sensitive to the voltage drop in the power line and will reliably act on the reclosing mechanism of the circuit breaker as soon as the overload or short-circuit in the network has disappeared, an operation which could be obtained heretofore only with the use of complicated and expensive amplifiers. The new simple device may be employed in other electrical apparatus and for other purposes as well.

It is an object of the present invention to provide in an electric apparatus, such as an automatic electric circuit-breaker of the reclosing type, a resonant member responsive to the frequency of the network or a higher harmonic thereof in such a manner that said member is effectively energized by the low alternating measuring current, when the circuit breaker has opened and the overload or short circuit in the network has disappeared, whereby said resonant member acts on the reclosing mechanism of said circuit breaker and causes it to close the circuit breaker.

It is a further object of the invention to provide a resonance reed responsive to the frequency of a higher harmonic of the frequency of the network and a switching means, through which the energizing winding of said resonance reed is fed with a measuring current derived from the network, when certain conditions occur in said network, i. e. when an automatic circuit breaker interrupts the main current, whereupon the energized resonance reed causes auxiliary circuits to become effective, i. e. to close said circuit breaker when the overload or short-circuit in said network has disappeared.

It is a still further object of this invention to provide in an automatic circuit breaker having a reclosing mechanism, a resonance reed responsive to the frequency of the alternating current network and to provide an alternating current measuring circuit through said network, whereby said measuring alternating current circuit acts on said resonance reed to close said circuit breaker previously opened upon occurrence of an overload or a short circuit, if said overload or short circuit has disappeared.

It is another and important object of this new resonance reed actuated reclosing mechanism to provide a device adapted to gradually decrease the sensitivity of said reed switch after repeated opening of the circuit breaker due to continued presence of the overload and repeated reclosing, whereby finally said reed switch may be rendered ineffective, so that the circuit breaker will not be reclosed.

It is a still further and important object of the present invention to provide in a reclosing means for an automatic circuit breaker an energizing coil having an impedance similar to the load impedance of the network and matched to the low impedance values of the network in case of overloads or short-circuits, and switching means adapted to connect said energizing coil to the network to be protected upon opening of the main contacts of the circuit breaker in such a manner that a measuring current flows through said coil, energizes the latter in accordance with the values of said measuring current and initiates the reclosing step of the circuit breaker via said coil if the measuring current exceeds a predetermined value. This coil may be the energizing coil of a resonance reed, as described in the foregoing, or the control winding of a magnetic amplifier replacing said resonance reed and constituting the measuring element controlling the reclosing operation in a modified embodiment of this invention.

These and other important objects and advantageous features of the present invention will be apparent from the following detailed description and drawings, appended hereto, wherein merely for the purposes of disclosure, non-limitative embodiments of this invention are set forth.

In the drawings:

Figure 1 is a circuit diagram of an automatic thermally operated circuit breaker with a reclosing mechanism actuated by a resonance reed according to this invention.

Fig. 2 is a circuit diagram of an automatic electromagnetically operated circuit breaker with a reclosing mechanism actuated by a resonance reed according to this invention.

Fig. 3 is a circuit diagram of a similar circuit breaker, as shown in Fig. 2, with a servo-motor operated reclosing mechanism controlled by a resonance reed according to the invention.

Like parts in these figures are indicated by the same reference characters.

Figure 5:
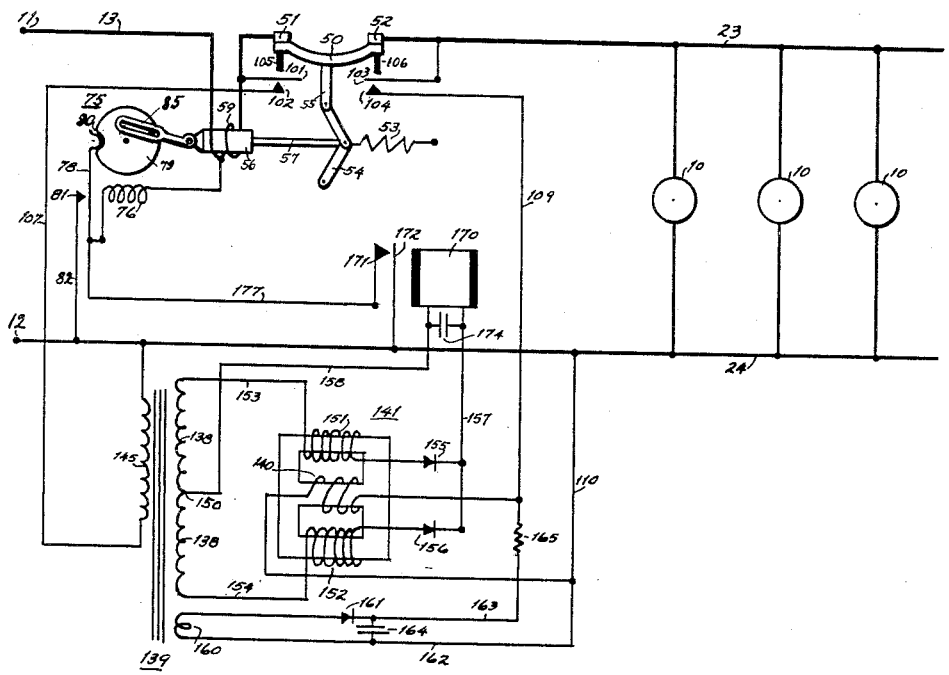
Fig. 5 is a circuit diagram of an automatic electric circuit breaker with a servo-motor operated reclosing mechanism controlled by a magnetic amplifier, taking the place of the resonance reed, shown in Fig. 3.

The circuit breaker in Fig. 1 is inserted in a circuit supplying the lamps 10 or other electric apparatus or machines with current from the terminals 11 and 12 of an alternating current source, not shown. The main or load circuit through this circuit breaker in closed condition can be traced from the terminal 11 through the conductor 13, a first flexible wire 14, an armature 15, a hot wire 16, a second flexible wire 17, a fixed contact 18, an opposite contact 19 on the movable end of a leaf spring 20 fixed at its opposite end at 21 and biased to move away from said fixed contact 18 in the direction of the arrow 22, a conductor 23, the lamps 10 or other electric apparatus or machines, the conductor 24 to the terminal 12. The leaf spring 20 is suitably of the snap-acting type.

The contacts 18 and 19 are held closed with the aid of the armature 15 attracted by its electromagnet 25 and pulling the hot wire 16 and an intermediate member 26 of insulating material and thereby tending to displace the contact 19 on the free end of the spring leaf 20 in the direction opposite to that indicated by the arrow 22, whereby the biasing force of said spring leaf 20 is overcome. The electromagnet 25 attracts its armature 15 when said magnet is energized by an alternating current suitably supplied from the same current source, i. e. when the circuit breaker is in closed condition. The holding circuit of this electromagnet 25 can be traced from the terminal 11 through the conductor 13, a resistor 27, electromagnet windings 28, a conductor 29, a fixed contact 30, an opposite displaceable contact 31 on the free end of a leaf spring 32 having its opposite end fixed at 33, a conductor 34, the conductor 24 to the terminal 12. The leaf spring 32 is biased to hold the contacts 30 and 31 closed.

When a short-circuit or an overload of above a certain value occurs in the network supplied through and protected by the circuit breaker in Fig. 1, the hot wire 16 will expand to such an extent that the contact 19 separates from the contact 18 under the snap action of the leaf spring 20 biased to move in the direction of the arrow 22, whereby an insulating piece 35 secured to said leaf spring 20 near its free end strikes the upper tip of the leaf spring 32, displaces it in the direction of the arrow 22 and separates the contacts 30 and 31. The load circuit is interrupted by the separation of the contacts 18 and 19 and simultaneously the holding magnet 25 is de-energized by the separation of the contacts 30 and 31, interrupting the energizing circuit through the winding 28 of said holding magnet. As a result of this, the armature 15 is released and moves slightly to the right.

The leaf spring 20 moving in the direction of the arrow 22 will abut a fixed contact 36 connected to a wire 37 between one of the terminals of the secondary 38 of a transformer 39 and one of the terminals of an energizing winding 40 of a resonance reed 41, one end 42 of which is fixed, while its free end can swing between opposite poles of a permanent magnet 43. The fixed end 42 of this reed 41 is connected to a wire 44 interconnecting the other of the terminals of the secondary 38 of said transformer 39 and the other of the terminals of said energizing winding 40, said wire 44 being further connected to the conductor 34. One of the terminals of the primary 45 of the transformer 39 is connected to the contact 19 via the conductor 23, while the other terminal of said transformer is connected to the opposite contact 18 through a resistor 46, i. e., the primary 45 of the transformer 39 and the series-connected resistor 46 over-bridge the contacts 18 and 19. As a result of the separation of the contacts 18 and 19, the primary 45 of the transformer 39 will be energized by an alternating current, the circuit of which can be traced from the terminal 11 through the conductor 13, the flexible wire 14, the armature 15, the hot-wire 16, the flexible wire 17, the resistor 46, the primary 45, the conductor 23, the lamps 10 and/or a short-circuit, the conductor 24 to the terminal 12. This energizing current is very low, as the resistor 46 is suitably high-ohmic. The transformer 39 is a step-down transformer so that the voltage across the terminals of its secondary 38 feeding the energizing coil 40 of the resonance reed 41 through the wires 37 and 44 is still lower than that at the primary side. The load circuits, including the lamps 10 and/or the short-circuit, are in shunt to the energizing coil 40 of the resonance reed 41 when the contacts 19 and 36 are connected which takes place as soon as the circuit breaker interrupts the load circuit. This shunt circuit, through which a measuring current flows, can be traced from the wire 44 through the conductors 34 and 24, the lamps 10 and/or short-circuits, the conductor 23, the leaf spring 20, the closed contacts 19 and 36 to the wire 37. When an absolute short-circuit exists in any of the lamp circuits, the energizing coil 40 of the resonance reed 41 is also short-circuited due to this shunt connection and cannot be energized. If an overload rather than a short circuit exists in the load circuits, the impedance value of the load or lamp circuits controls the energizing voltage of the coil 40 of the reed 41 due to the shunt connection. When this impedance exceeds a certain predetermined value, i. e. when the load in the circuits is below the danger point, the energizing voltage of the coil 40 is sufficiently high to cause the reed 41 to vibrate or oscillate between the poles of the permanent magnet 43 to such an extent that this reed 41 will intermittently contact a fixed contact 47 connected to the conductor 29. This contact 47 is suitably adjustable so that its proper position with respect to the reed 41 can be readily adjusted. If the overload in the circuit persists, the impedance in shunt with the energizing coil 40 of the resonance reed 41 is so low that the voltage energizing said coil 40 is reduced below the value causing sufficient vibrations of the reed 41, i. e., oscillations of an amplitude large enough that the reed 41 engages the contact 47. The conditions in the network may be explained with the drop in the measuring voltage between normal operation and overload condition. This voltage drop controls the reed sensitivity.

The reed 41 has such quality coefficient that it will vibrate in accordance with the frequency of the network when the coil 40 is sufficiently energized. In case of a network with an alternating current of 60 cycles, the reed 41 will vibrate 60 times and engage and disengage the contact 47 with the same frequency. Thus an intermittent current will flow through a circuit which can be traced from the terminal 12, the conductors 24 and 34, the vibrating reed 41, the contact 47, the conductor 29, the energizing windings 28, the resistor 27 to the terminal 11. This current will energize the electromagnet 25 which will attract its armature 15 pulling the hot wire 16, which has cooled down in the meantime and contracted, i. e. returned to its original length, and the insulating member 26 and the leaf spring 20 to the left, whereby the contacts 18 and 19 become engaged and the load circuit reclosed. It will take approximately two seconds until the reed 41 vibrates sufficiently to engage the contact 47. In other words, there is a short time delay in the operation of the reclosing means. This time delay, which may be varied, is desirable in the reclosing operation.

The magnet 25 will maintain the circuit breaker in the closed position, since the contacts 30 and 31 are engaged in this position and close the holding circuit, while the energizing circuit of the reed coil 40 is interrupted due to the separation of the contacts 18 and 36.

The resonance reed 41 is very sensitive and operates satisfactorily with an extremely low electric energy of, of example, .7 milliwatt. Consequently, a measuring voltage of, for example, .06 volt to be applied to the coil 40 of the resonance reed 41 will be sufficient in case of a circuit to be protected having, in cool state, an impedance value of .5 ohm. Therefore, this energizing coil can be built like an element of a low-current apparatus. Since the response of the resonance reed can be made non-linear, the amplitudes of oscillation of the reed will be large enough so that said reed engages the contact 47 only at and above a definite and predetermined energizing voltage. These non-linear response conditions of the resonance reed can be improved by making use of the higher harmonic of the frequency of the energizing current. For example, the second harmonic, i. e., 120 cycles in case of a 60 cycle alternating current network, can be easily obtained by inserting a rectifier (not shown in the drawing) in one of the conductors 37 or 44 connected to the energizing coil 40 of the reed 41. If this reed is energized, it will vibrate or oscillate 120 times. In a similar manner any other higher harmonic of the network frequency may be used. While the network frequency is mostly 60 cycles, measuring currents of any other frequency, for example, 50 cycles, may be used if reeds of suitable resonance frequencies are employed.

If the resonance reed 41 is properly dimensioned and the contact 47 suitably adjusted, the alternating current supplied to the reclosing or holding magnet windings 28 via said reed 41 and said contact 47 will be rectified so that a pulsating direct current is fed to said windings 28. The electromagnet 25 operates better when fed with direct current than with alternating current. In other words, a lower direct current than alternating current is required for energizing the electromagnet 25 to attract the armature 15. Consequently, the dimensions of the electromagnet 25 may be reduced. The operation of this electromagnet 25 with rectified direct current can be improved by connecting a suitably dimensioned condenser (not shown in the drawing) across the terminals of the windings 28 of the magnet 25.

In the embodiment of Fig. 2, an automatic electric circuit breaker with electromagnetic release and a reclosing control system according to this invention is illustrated. A circuit breaker proper or arm 50 is adapted to interrupt the circuit to be protected under snap action, i. e. by moving downwards and thereby disengaging the fixed contacts 51 and 52 in the conductor or line 23, said contacts being overbridged by said breaker or arm 50 when the circuit breaker is closed. This breaker or arm 50 is biased towards closed position by means of a tension spring 53 acting on said breaker or arm 50 with the aid of a pair of articulated links 54 and an intermediate rod 55. To open the circuit breaker the action of the spring 53 has to be overcome by an armature 56 and an intermediate rod 57 moving in the direction of the arrow 58 and expanding the spring 53. This operation takes place when the current in an operating winding 59 on said armature 56 exceeds the maximum current permitted to flow through the circuits to be protected. When such overload occurs and the circuit breaker or arm 50 has moved downwards with the aid of the armature 56 acted upon by the winding 59, the main contacts 51 and 52 are disconnected and simultaneously a holding circuit through a holding coil 60 on the armature 56 is completed. This circuit can be traced from the terminal 11 of the alternating current source through the conductor 13, the holding coil 60, the conductor 61, a pair of closed relay contacts 62, 63, a conductor 64, the conductor 23, the lamps 10 or a short-circuit, the conductor 24 to the terminal 12. The holding coil 60 which overbridges the main contacts of the open circuit breaker and the coil 59 have a relatively high impedance so that a rather low current, for example, between 50 to 100 milli-amps will flow through said coil 60 and the conductors 23 and 24 of the lamp circuits, whereby the low impedance of these circuits in case of short-circuits and overloads is taken into account. The coil 60 when energized by this low current has just the power to hold the armature 56 in the position in which it was previously moved under the action of the operating coil 59, which became de-energized when the main contacts 51 and 52 were disconnected. Simultaneously, with the opening of these main contacts, auxiliary contacts 65 and 66 were overbridged by the arm 50, whereby an auxiliary circuit, including the energizing coil 40 of the resonance reed 41 was closed. This circuit which is in shunt to the lamp circuits can be traced from the terminal 11 of the alternating current source through the conductor 13, the coil 60, the conductor 61, the closed relay contact pair 62, 63, the conductor 64, the contact 66, the arm 50, the contact 65, the conductor 67, the energizing coil 40 of the resonance reed 41, the conductor 24 to the terminal 12 of said current source.

A third winding 68 on the armature 56 is energized like a secondary of a transformer by the coil 60 on the same armature. One terminal of this winding 68 is connected to the conductor 24 through the conductor 69, while its other terminal is connected to the one terminal of a winding of a relay 70 through a conductor 71 and the other terminal of said relay winding is connected to the adjustable stationary contact 47 opposite the reed 41.

When the impedance of lamp circuits is too low, due to the presence of a short-circuit or overload, the voltage across the energizing coil 40 of the resonance reed 41 is too low to cause a sufficient vibration of said reed, since said coil 40 is in shunt to the lamp circuits. In this case no reclosing operation of the circuit breaker takes place. If the short-circuit or overload in the lamp circuits is removed, the impedance in the lamp circuits increases and a voltage drop of such value manifests itself across the energizing coil 40 that the reed 41 vibrates and intermittently engages the fixed contact 47. As a result of the vibration of the reed 41, a circuit including the winding of the relay 70 is intermittently closed. This circuit can be traced from the one terminal of the winding 68 through the conductors 69 and 24, a conductor 73, the reed 41, the fixed contact 47, the winding of the relay 70, the conductor 71 to the other terminal of said winding 68. An alternating current will now flow through the winding of the relay 70 which will be energized to attract the armature or leaf spring carrying the contact 62 and separating the latter from the fixed opposite contact 63, whereby the current through the circuit of the holding coil is interrupted. The leaf spring carrying the contact 62 is biased to engage its opposite contact 63, i. e., the relay 70 when energized is acting against the force of the contact spring normally holding the relay contacts 62, 63 closed. As a result of the interruption of the circuit of the holding coil 60, the latter will become de-energized and release the armature 56. The circuit breaker 50 will now be immediately reclosed by the action of the spring 53 with the aid of the links 54 and the intermediate rod 55.

A condenser 74 may be connected across the terminals of the coil of the relay 70 to smooth out the wave form of the alternating current energizing the relay coil and thereby improve the operation of said relay. It is also possible, as in the embodiment shown in Fig. 1, to convert the alternating current supplied to the coil of the relay 70 in a pulsating direct current by the vibration of the reed 41. This reed 41 in Fig. 2 can be made to respond to any network frequency and higher harmonics in principally the same manner as described in connection with the embodiment of Fig. 1.

In the circuit diagram in Fig. 3, the circuit breaker 50 is opened with snap action in principally the same manner as in Fig. 2 under the action of an operating coil 59 when a short circuit or overload occurs. The spring 53 in this embodiment may be a compression spring rather than a tension spring. The closing of the circuit breaker in Fig. 3 is caused by an electric servo-motor 75 rather than by spring action as in Fig. 2. This servo-motor 75 is controlled by the resonance reed 41 in a somewhat similar manner as the members causing the reclosing operation in the embodiments of Figs. 1 and 2.

The servo-motor 75 has an energizing winding 76, one terminal of which is connected to the conductor 13, while its other terminal is connected through the wire 77 to the stationary and adjustable contact 47 and to a leaf spring 78 riding on the periphery of a cam 79 mounted on the shaft of said servo-motor. The cam 79 has a notch 80 in which the correspondingly shaped end of said leaf spring 78 engages at a certain position of said cam, i. e., its normal or initial position. A fixed contact 81 opposite said leaf spring 78 is connected to the conductor 24 through the wire 82. When the circuit breaker is closed, the leaf spring 78 biased to separate from the fixed contact 81 engages the notch 80 whereby the leaf spring 78 is disengaged from the said fixed contact.

The circuits of the measuring current and the resonance reed in the embodiment of the circuit breaker in Fig. 3 are similar to those in Fig. 1. One terminal of the primary 45 of the step-down transformer 39 in Fig. 3 is connected to the conductor 23, while its other terminal is connected to the conductor 13 via the high-ohmic resistor 46. The secondary 38 of said transformer 39 is connected to the energizing coil 40 of the resonance reed 41 in the same manner as in Fig. 1, whereby the one wire 44 of the two connecting wires between the secondary 38 is connected to the conductor 24 via the conductor 34 and the other wire 37 of said wires is connected to the fixed contact 65 through a conductor 82. This fixed contact 65 and the fixed contact 66 are the same auxiliary contacts as in Fig. 2, which are overbridged by the circuit breaker or arm 50, when this circuit breaker is in open position. In this position, an energizing circuit through the primary 45 of the step-down transformer 39 can be traced from the terminal 11 of the alternating current source through the conductor 13, the high-ohmic resistor 46, the primary 45 of the transformer 39, the conductor 23, the lamps 19 or a short-circuit, the conductor 24 to the terminal 12.

When the transformer 39 is energized in this manner, a measuring current will flow through the load circuit in shunt to the energizing coil 40 of the resonance reed. This circuit can be traced from the wire 44 through the conductors 34 and 24, the lamps 19 or a short-circuit, the conductor 23, the contact 66, the arm 50, the contact 65, the conductor 82 to the wire 37. The action of the measuring current on the energizing circuit of the reed 41 and the control of the reclosing means is principally the same as in Fig. 1. However, in the embodiment of Fig. 3, the resonance reed 41, when sufficiently energized, closes intermittently the circuit through the energizing winding 76 of the servo-motor 75 rather than through the electromagnet windings 28 as in Fig. 1. This servo-motor 75 starts to run when its winding 76 is energized in this manner and rotates the cam 79 in the direction of the arrow 83. The front end of the leaf spring 78 riding on the periphery of the cam 79 now leaves the notch 80, whereby this leaf spring is forced in engagement with the fixed contact 81 closing a circuit which can be traced from the terminal 11 through the conductor 13, the energizing winding 76 of the motor 75, the leaf spring 78, the fixed contact 81, the conductor 24 to the terminal 12. In other words, a second energizing circuit through the winding 76 of the servo-motor 75 is closed during the rotation of the cam 79, so that this servo-motor 75 will continue to run, after the first energizing circuit through the resonance reed 41 is interrupted. A pin 84 suitably mounted near the periphery of the cam 79 of the servo-motor 75 engages the slot of a slotted link 85 pivotally connected to the free end of the armature 56 in such a manner that said armature is displaced to close the circuit breaker 50, when the cam 79 turns causing the pin 84 to convert the rotating movement of the cam 79 into a linear movement acting on the armature 56. The circuit breaker 50 is closed after one full rotation of the cam 79, which then arrives at its starting position. The front end of the leaf spring 78 engages the notch 80 at this position of the cam 79, whereby the circuit through the energizing winding 76 of the servo-motor 75 will be immediately interrupted due to the separation of the leaf spring 78 from the fixed contact 81.

As a result of the interruption of this second energizing circuit of the winding 76 of the servo-motor, the latter stops immediately, since the first energizing circuit is likewise interrupted when the circuit breaker 50 is in closed position. This first energizing circuit was interrupted, when due to the closing of the contacts 51 and 52 by the circuit breaker or arm 50 the primary 45 of the transformer 39 and the series-connected high-ohmic resistor 46 were short-circuited, the coil 40 of the resonance reed 41 de-energized and as a result of this the vibration of said reed stopped, so that this reed could not engage the contact 47.

The slot in the link 85 provides for a lost motion in the reclosing mechanism. When the circuit breaker 50 is released and its main contacts opened under the action of the operating winding 59, the armature 56 is displaced to the right. Due to the provision of this long slot in the link 85, the latter can be freely displaced when the armature moves to the right, whereby said link is guided on the pin 84.

If in networks long-lasting overloads occure, which are not removed, successive opening and reclosing cycles of the automatic circuit breaker may repeat for the duration of these overloads. Such operation is undesirable or even dangerous for the electric system. The decrease is the impedance of the load circuit due to varying temperature differences between hot and cold circuit conditions may be one of the causes for the tendency of these circuit breakers to repeatedly open and close. According to a further development of this invention, shown in Fig. 4, these difficulties are overcome by providing in the circuit breaker a means for decreasing the sensitivity of the resonance reed.

Figure 4:
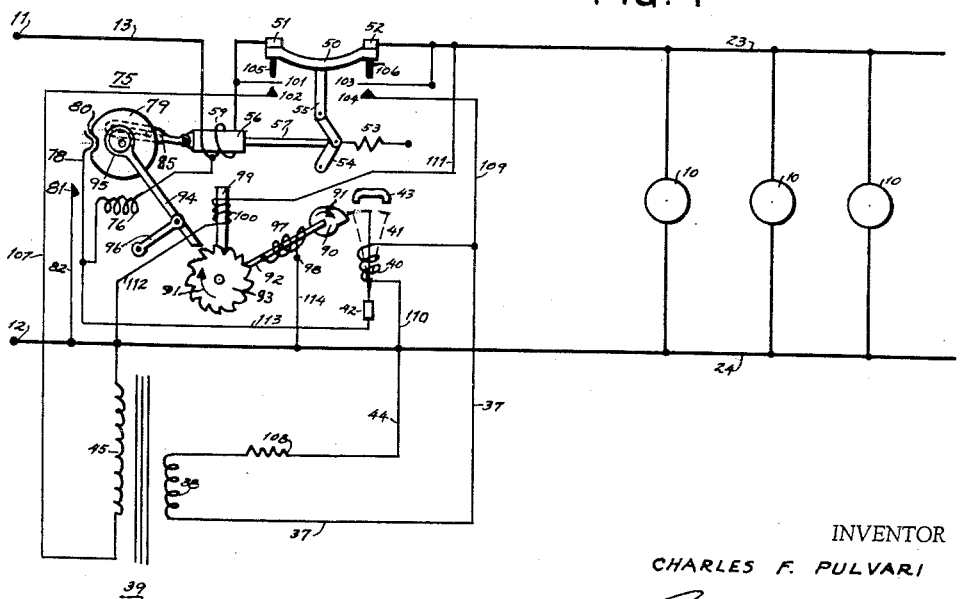
Fig. 4 is a circuit diagram of an automatic electric circuit breaker with a servo-motor operated reclosing mechanism, similar to Fig. 3, having a reed switch member associated with a means to gradually decrease its sensitivity.

While in Fig. 3 the contact 47 is stationary, in Fig. 4 the periphery of a cam-shaped member 90 rotatably mounted is used as variable contact piece cooperating with the vibrating or resonance reed 41. The cam of said member 90 has the general shape of an exponential or linear curve and is adapted to be rotated in the direction of an arrow 91, whereby starting from the normal or initial position having the shortest distance to the reed 41 when at rest, the distance between the cam member 90 and reed 41 is gradually increased to a maximum after said cam member has made one full turn. This cam member 90 is secured to a shaft 92 which is driven by a ratchet wheel 93, rotated stepwise. A pawl 94, having one end pivotally connected to an eccentric 95 associated with the cam 79, advances the ratchet wheel 93 one tooth when said cam 79 makes one full turn. The pawl 94 is hinged to one end of a lever 96, the other end of which is pivoted on a fixed pin. A helical spring 97 about the shaft 92 is wound up more and more with each step-by-step movement of the ratchet wheel 93. One end of said spring is secured to the shaft 92, while its other end is held stationary at 98. A ratchet bar 99 engages one of the teeth of the ratchet wheel 93 and retains said wheel in position after each step movement. This ratchet bar 99 is an armature which can be raised to disengage from one of the teeth of the ratchet wheel 93, when a winding 100 around said armature is energized.

This energizing circuit, which is closed when the main contacts 51 and 52 of the circuit breaker are closed, can be traced from the terminal 11 of the alternating current source through the operating coil 59, the contact 51, the arm 50, the contact 52, the conductor 23, a conductor 111, the winding 100, a conductor 112, the conductor 24 to the terminal 12 of said current source. When the circuit breaker interrupts the main circuit through the contacts 51 and 52, the energizing circuit of the winding 100 will be likewise interrupted and the armature or ratchet bar 99 released to engage one of the teeth of the ratchet wheel 93.

The circuits in the circuit breaker diagram of Fig. 4 are slightly different from those in Fig. 3. Upon opening of the main contacts 51 and 52 by the circuit breaker or arm 50, two independent contact pairs 101, 102 and 103, 104, respectively, are closed when insulating pieces 105 and 106 attached to the arm 50 cause contact members 101 and 103 to engage their opposite contact members 102 and 104, respectively. As a result of this, the circuit energizing the step-down transformer 39 and the measuring circuit are closed. The transformer energizing circuit can be traced from the terminal 11 of the alternating current source through the conductor 13, the operating coil 59, the contact 101, the contact 102, the conductor 107, the primary 45 of the step-down transformer 39, the conductor 24 to terminal 12 of said current source. When current flows through the primary 45 of this transformer 39, its secondary 38 is energized and feeds the energizing winding 40 of the resonance reed 41 through the connecting wires 37 and 44 and a high-ohmic resistor 108 inserted in the wire 44. The measuring circuit in shunt to said energizing winding 40 can be traced from one of the terminals of this energizing coil through a conductor 109, the contacts 104 and 103, the conductor 23, the lamps 10 or a short-circuit, the conductor 24, a conductor 110 to the other of the terminals of said energizing coil 40. The circuit of the energizing winding 76 of the servo-motor 75 closed by the vibrating reed 41 can be traced from the terminal 11 of the alternating current source through the conductor 13, said energizing winding 76, a conductor 113, the resonance reed 41, the cam-shaped contact member 90, the shaft 92, the helical spring 97, wire 114, the conductor 24 to the terminal 12 of said current source. The circuit of said energizing winding 76 to be closed by the contact 81 and the leaf-spring 78 is the same as that in Fig. 3.

The opening and reclosing operations of the circuit breaker in Fig. 4 are principally the same as those in Fig. 3. When after a first opening of the circuit breaker or arm 50, the cam 79 driven by the servo-motor 75 makes one full turn to reclose said circuit breaker in the same manner as in the embodiment of Fig. 3, the pawl 94 is rocked by the eccentric 95 associated with said cam and the ratchet wheel 93 is advanced one tooth. The cam-shaped contact member 90 driven by said ratchet wheel with the aid of the shaft 92 is turned a few degrees during said step movement in the direction of the arrow 91, whereby the distance between the reed 41 and said contact member is slightly enlarged so that somewhat larger vibration and a correspondingly higher energization of the coil 40 of the resonance reed 41 is required for said reed to engage the periphery of the cam-shaped contact member 90, i. e., the sensibility of the reed 41 is reduced. As a result of this, a subsequent reclosing operation upon a further opening of the circuit breaker will be permitted only if the overload in the circuit has somewhat decreased with respect to the originally permissible and set overload value, i. e., if the impedance of the load circuit has somewhat increased. The sensibility of the reed 41 is gradually decreased in this manner with each subsequent reclosing operation and the step-wise rotation of the cam contact member 90 until a minimum sensibility is adjusted, at which the reclosing operation can be carried out, if the overload is substantially reduced. In the event the overload is not reduced to the extent the sensibility of the reed 41 is reduced, no reclosing operation takes place and the circuit breaker remains open.

When finally the overload or short-circuit has been removed, the circuit-breaker will be automatically closed, whereby the energizing circuit of the winding 100 of the ratchet bar 99 is closed, as has been mentioned in the foregoing. This ratchet bar 99 will be raised under the action of the winding 100 after a certain period of time has elapsed, i. e., this energizing circuit has a time-delay and/or may be equipped with a special time-delay means known per se and not shown in Fig. 4. Thus, the ratchet wheel 93 is released after the expiration of said time interval which may be from a few seconds to several minutes. The time delay may be adjustable, so that the delay most suitable for the individual operating conditions of the network to be protected by the automatic circuit breaker can be readily adjusted. Upon release of the ratchet wheel 93 by the lifting of the ratchet bar 99, the latter returns to its original position under the action of the helical spring 97 previously wound up, whereby the cam-shaped contact member 90 is moved back to its initial position, i. e., the reed 41 is adjusted to its initial or highest sensibility. Due to the time delay of the release of the ratchet bar 99, the decreased sensibility of the resonance reed 41 is retained for a period of time corresponding to the foremost overload conditions in the circuits to be protected. These conditions make such reduced sensibility desirable. Actually the reduced sensibility remains adjusted only for a short interval during which the repetition of overload peaks is most probable. Thereafter, the resonance reed 41 is adjusted to its original setting and the reclosing operation will take place with the initial, i. e., higher sensibility.

If an automatic circuit breaker with a reclosing mechanism, according to Fig. 4, is used, for example, in electric circuits in shops or laboratories, the personnel will become quickly accustomed to the gradually decreasing sensibility of the reclosing operation in case of repeated circuit interruptions within a short time and consequently will immediately take proper steps to reduce persisting overloads. Thus this new circuit breaker compels the machine operators in shops or scientists and workers in laboratories to operate the electrical apparatus and machinery in such a manner that overloads repeating within short intervals are prevented, so far as possible, and that after each opening operation of the circuit breaker the total load in the circuits is reduced, whereby the safety of electric system is greately improved.

In the embodiment of the automatic circuit breaker, shown in Fig. 5, the resonance reed is replaced by a magnetic amplifier 141 which also has a low-ohmic energizing coil matching the low impedance values of the network in case of overloads or short-circuits. Such magnetic amplifiers are known per se and their construction, operation and characteristics are described in the following publications: "The Amplistat—A Magnetic Amplifier" by R. E. Morgan, Electric Engineering, August 1949; "Transductor Fundamentals" by Swen Eric Hedstroem and Len F. Borg, Electronics, September 1948; "Saturable Reactors and Magnetic Amplifiers" by Frank G. Logan, Electronics, October 1948; Magnetic Amplifier Design Handbook, Bulletin 2000, by Vickers Electric Division, St. Louis, Missouri.

The circuit breaker in Fig. 5, including its reclosing means, is principally the same as that in Fig. 3. The primary 145 of step-down transformer 139 is connected to the circuit breaker circuit in Fig. 5 in the same manner as the primary 45 of the transformer 39 in Fig. 4. The secondary 138 of this transformer is tapped in the center at 150. The two outer terminals of this secondary 138 are connected to one of the terminals of two windings 151 and 152, respectively, through conductors 153 and 154, respectively. Each of these windings 151 and 152 is on one of the outer legs of a three-legged iron core of a magnetic amplifier 141. The others of the terminals of said two windings 151 and 152 are connected to the inputs of rectifiers 155 and 156, respectively, and the outputs of these rectifiers are interconnected and connected through a wire 157 to one of the terminals of a coil of a relay 170, which is similar to the relay 70 in Fig. 2. The other of the terminals of this relay coil is connected to the center 150 of the secondary 138 of the transformer 139 via a conductor 158. Thus, a rectified alternating current can be supplied to the relay 170, the wave form of said current being smoothed out by means of a condenser 174 across the terminals of the relay coil. When the primary 145 of the transformer 139 is energized, a very low direct current will flow through the secondary 138 and the windings 151 and 152, the iron legs of which will be pre-saturated by the resulting energization with direct current. A winding 149 having a low impedance value matching the impedance of the circuit in case of overloads or short-circuits is provided on the center leg of the iron core of the magnetic amplifier 141, said winding 140 taking the place of the energization coil 40 of the resonance reed 41 in Fig. 3. Accordingly, this coil 140 is connected to the load circuit through the conductors 109 and 110. The coil 140 is fed with a rectified alternating current obtained from a further secondary 160 of the transformer 139 via a rectifier 161 through a wire 162 connecting the free terminal of the secondary 160 to the conductor 110 and through wire 163 connecting the free terminal of the rectifier 161 via a resistor 165 to the conductor 109, while the opposite terminals of the coil 160 and the rectifier 161 are interconnected. The coil 160 has only a few turns, so that the voltage across its terminals is low. A condenser 164 across the wires 162 and 163 is provided to smooth out the wave form of the rectified current supplied to the coil 140 on the center leg. When the circuit breaker in Fig. 5 is open, the coil 140 and its source of rectified current are connected in shunt to the load circuit.

The operation of the magnetic rectifier 141 in the circuit breaker of Fig. 5 can be compared with that of the resonance reed 41, in Fig. 3. If the circuit breaker in Fig. 5 has opened its main contacts 51 and 52 due to the occurrence of a short-circuit or overload in the circuits, the auxiliary contacts 101, 102 and 103, 104, respectively, are simultaneously closed, whereby the transformer 139 is energized and the winding 140 connected to the overload circuit, so that a low control or measuring current can flow through said winding and said load circuit. This low current is the rectified or pulsating direct current supplied to the winding 140 from the secondary 160 via the rectifier 161. The reactance of the windings 151 and 152 on the outer legs of the iron core pre-saturated due to the action of the low rectified or pulsating direct current flowing through said windings is changed under the influence of the measuring current, which in turn is a function of the impedance of the overload circuit. If the impedance value of this overload circuit is low, the shunting action of this circuit is considerable. Consequently, the current flowing through the winding 140 and adapted to influence the reactance of the windings 151 and 152 is so low that this reactance remains practically unchanged. In this case, practically no current will be supplied to the coil of the relay 170 via the conductors 157 and 158, since only a very low and ineffective current can flow through said windings 151 and 152 due to the pre-saturation of the iron core. Thus, the relay 170 remains unenergized, i. e., its armature 171 biased to disengage from an opposite contact 172 will remain in the open contact position rather than be attracted by the relay magnet. The armature 171 is connected to the leaf spring 78 and the energizing winding 76 of the servo-motor 75 through the conductor 177. As soon as the short-circuit or the overload is removed from the circuit, its impedance increases and permits a current to flow through the winding 140 high enough to change the reactance of the windings 151 and 152 in such a manner that a rectified or pulsating direct current will flow through said windings and will be supplied to the coil of the relay 170. The armature 171 of the relay 170 will now be attracted and the circuit through the energizing windings 76 of the servo-motor 75 closed in the same manner as in the circuit through the same energizing winding is closed in Fig. 3 via the contact 47 and the reed 41. The servo-motor 75 will start to run, reclose the circuit breaker and stop running after the reclosing operation in the same manner as described with reference to Fig. 3.

With respect to the operation and characteristics of this magnetic amplifier, reference is made to the publications mentioned in the foregoing. According to these publications, amplification ratios of 1 to 10 or even more can be obtained with this amplifier. Thus, relatively high currents can be controlled by very low measuring currents. Consequently, the provision of intermediate electronic amplifiers will be unnecessary, though they may be employed in certain cases.

The relay 170 in the circuit diagram of Fig. 5 may be replaced by a resonance reed, such as 41 in Fig. 3. The resonance reed in this case would be constructed and adjusted to respond to the second harmonic of the network frequency, i. e. 120 cycles, if the network frequency is 60 cycles.

Figure 6:
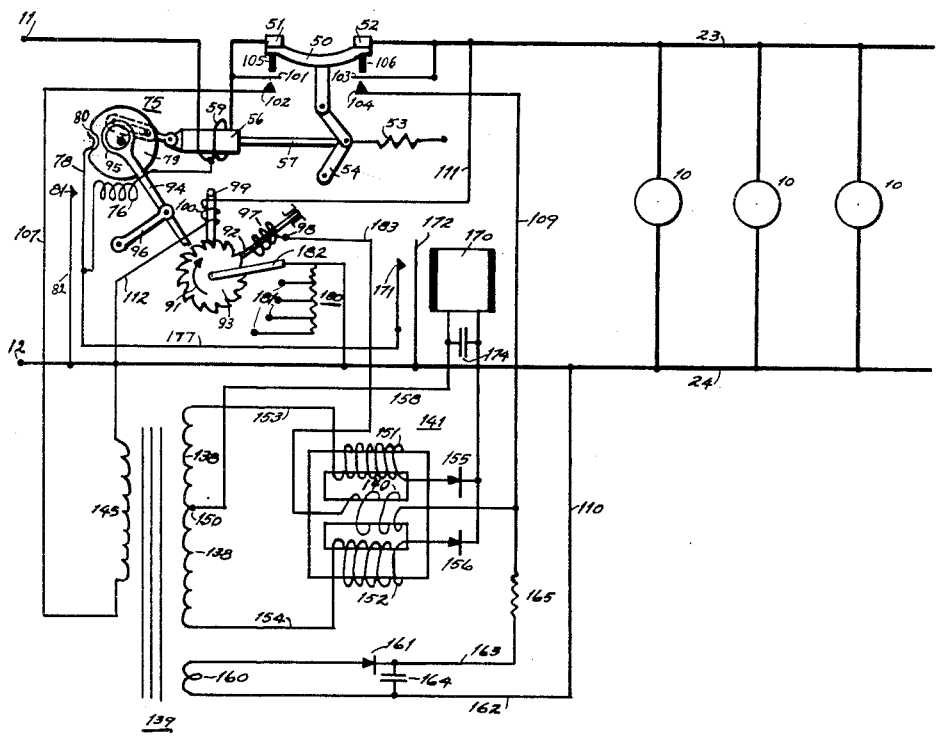
Fig. 6 is a circuit diagram of an automatic electric circuit breaker, similar to Fig. 5, having a means adapted to gradually decrease the sensitivity of the reclosing switch.

The circuit breaker, as in Fig. 6, has principally the same reclosing mechanism, the same magnetic amplifier controlling said mechanism and intermediate relay as the circuit breaker in Fig. 5. In addition to these members, the circuit breaker in Fig. 6 is equipped with a member adapted to decrease the sensibility of the magnetic amplifier in case of repeated opening and reclosing of the circuit breaker due to the persistence or re-occurrence of overloads within a predetermined time interval. The member to decrease this sensibility comprises a rheostat 180 having a plurality of taps 181 arranged on a circular path and being adapted to be contacted by a rotating rheostat arm 182. This arm 182 mounted on the ratchet wheel 93 is rotated or advanced stepwise by means of the same mechanism and in the same manner as shown in Fig. 4. The circuits of the windings of the magnetic amplifier 141 in Fig. 6 are the same as those in Fig. 5 with the exception that the rheostat 180 is inserted in the energizing circuit of the center or control winding 140 by connecting that terminal of said winding which is connected to the conductor 110 in Fig. 5 to the rheostat arm 182 via the conductor 183, the helical spring 97, the shaft 92 and ratchet wheel 93, while one of the ends of the winding of the rheostat 180 is connected directly to the conductor 24. As a result of this, the measuring current flowing through the winding 140 and its influence on the reactance of the windings 151 and 152 is decreased to the extent the effective resistance value in the circuit of the winding 140 is decreased. In other words, the sensibility of the magnetic amplifier 141 can be gradually decreased when the rheostat arm 182 is rotated from its initial position, shown in Fig. 6, in which the whole rheostat winding is in the measuring circuit, to a position in which no rheostat winding is in this circuit. The gradual decreasing operation of the sensibility of the magnetic amplifier 141, when the circuit breaker is repeatedly opened and reclosed, takes place under control of the same elements which control the stepwise decrease of the sensibility of the resonance reed 41 in Fig. 4 with the aid of the rotating cam 91. After an elapse of a predetermined period of time, the rheostat arm 182 is automatically returned to its original position, shown in Fig. 6, by the helical spring 97 acting on the shaft 92 and the ratchet wheel 93 when the latter is released by the lifting of the ratchet bar or armature 99 in the same manner as the shaft 92 and the ratchet wheel 93 are turned back in the embodiment of Fig. 4. Thus, reference is made to the description of the operation of the elements in Fig. 4 causing a decrease in the sensibility and its return to the original value. As the opening and reclosing steps of the circuit breaker of Fig. 6 are otherwise identical with those of the circuit breaker in Fig. 5, the description of these operations has not to be repeated.

The stepwise advanced rheostat 180 adapted to decrease the sensibility of the means for measuring the impedance of the overload circuit may be likewise used in the circuit breaker of Fig. 4. In this case, this rheostat would be inserted in the circuit of the energizing coil 40 of the resonance reed 41 and the cam 91 would be omitted or rather replaced by the rheostat arm 182 (see Fig. 6). It is also possible to provide a plurality of resonance reeds of different sensitivity to obtain a similar result. In this case, reeds of different quality coefficient would be energized by a common coil and the contacts adapted to be engaged by the vibrating reeds would be connected to a step switch which will comprise similar switching members as the rheostat 180 in Fig. 6.

While the present embodiments of the new circuit breaker show and describe its application to an alternating current network, it is possible to modify the circuit breaker construction so that it can be employed for a direct current network. In this case, either a separate alternating current source or a converting means, such as an oscillator, has to be provided to supply the required alternating or pulsating current to the resonance reed or the magnetic amplifier. The magnetic amplifier in Fig. 5 may be used in the circuit breakers of Fig. 1 or 2 to replace the resonance reed in these embodiments.

The new automatic circuit breaker, due to its simple and inexpensive construction, is capable of being embodied in small dimensions. In particular, the circuit breaker constructions of Figs. 1, 2, 3 and 5 lend themselves to be constructed for lower currents than automatic circuit breakers of the reclosing type have been manufactured heretofore. Thus, electric circuits for maximum currents of 5 amps. or less may be equipped with automatic circuit breakers with reclosing means according to the invention and the smaller types of this new automatic circuit breaker will be advantageously employed in electric branch circuits of shops, factories, laboratories and residences.

While the new and inventive means for measuring the impedance of overload circuits has been used in the foregoing embodiments to control the reclosing operations of automatic circuit breakers, other switching and/or control operations may be carried out with the aid of this new and inventive means. For example, alarm circuits may be controlled by the resonance reed or the magnetic amplifier, when the latter respond to overload circuit conditions. Such alarm circuits may be easily combined or associated with the new circuit breakers shown and described.

While several specific embodiments of the present invention have been shown and described in the foregoing, it is to be understood that the invention is not to be intended to be limited thereto, as various modifications and changes can be made in this invention without departing from the spirit and scope thereof as set forth in the appended claims.

I claim:

1. An automatic electric circuit breaker comprising in combination, a switch means having normally closed main contacts connecting a source of electric power to a load circuit, overload responsive means inserted in said circuit and having a releasing mechanism being adapted to release said switch means thereby separating said main contacts upon occurrence of short-circuit or overload currents in said load circuit, a resonance reed having an energizing coil, means on said switch means to shunt said coil across said loads upon separation of said main contacts, a source of periodic electric currents, said reed being responsive to the frequency of said periodic currents, means on said switch means to connect said source of periodic currents to said load circuit upon separation of said main contacts, a reclosing mechanism including actuating means adapted to return said main contacts from their open position to their closed position, linking means between said reed and said actuating means so that upon vibration of said reed at a predetermined amplitude said reed causes said actuating means via said linking means to operate said reclosing mechanism to close said main contacts, said source of periodic electric currents having such voltage that an effective energization of said coil to vibrate said reed at the predetermined amplitude takes place only when the impedance value of said shunted load circuit does not exceed a predetermined value.

2. In an automatic electric circuit breaker according to claim 1, said resonance reed being responsive to a higher harmonic of the frequency of said periodic electric currents.

3. In an automatic electric circuit breaker according to claim 1, said resonance reed being responsive to the second harmonic of the frequency of said periodic electric currents.

4. An automatic electric circuit breaker according to claim 1, wherein said energizing coil has a low impedance value matched to the low impedance values of said load circuit present in case of overloads and short-circuits.

5. An automatic electric circuit breaker according to claim 1, wherein a common alternating current source is the source of electric power and the source of periodic electric currents, and wherein said means to connect said source of periodic electric currents to said load circuit includes a high impedance inserted between said alternating current source and said load circuit upon the occurrence of short-circuits and overloads.

6. An automatic electric circuit breaker according to claim 5, wherein said high impedance is connected across said main contacts.

7. An automatic electric circuit breaker according to claim 5, wherein a step-down transformer is provided having a primary and a secondary, and wherein said high impedance includes said primary, said secondary being connected across said energizing coil of said reed to feed said coil upon the occurrence of short-circuits or overloads in said load circuit.

8. An automatic electric circuit breaker comprising in combination, a switch means having main contacts and overload responsive means adapted to automatically interrupt an alternating current load circuit to be protected by said circuit breaker upon the occurrence of short-circuit and overload currents in said network, a reclosing mechanism associated with said switch means and being adapted to return said main contacts from their open to their closed position, a resonance reed having an energizing coil and being responsive to the frequency of the current in said network, means on said switch means to shunt said coil across said loads upon opening of said switch means, a high impedance, means to connect said high impedance across said main contacts, a pair of normally open contacts operatively connected to said reed and being adapted to be closed thereby when said reed vibrates at a predetermined amplitude, an auxiliary circuit including electric actuating means of said reclosing mechanism and said pair of reed contacts in series with a source of electric energy so that upon vibration of said reed caused by sufficient energization of said coil, through which a low measuring current flows due to the insertion of said high impedance, said auxiliary circuit is intermittently closed through said reed contacts and thereby said reclosing mechanism caused to close said switch means.

9. An automatic electric circuit breaker according to claim 8, wherein said overload responsive means is a hot-wire inserted in said load circuit.

10. An automatic electric circuit breaker according to claim 8, wherein said electric actuating means of said reclosing mechanism is an electromagnet having an energizing winding in said auxiliary circuit.

11. An automatic electric circuit breaker according to claim 8, wherein said overload responsive means is an electromagnet having an overload coil inserted in said load circuit.

12. An automatic electric circuit breaker according to claim 8, wherein said actuating means of said reclosing mechanism is an electric servo-motor having an energizing winding in said auxiliary circuit.

13. An automatic electric circuit breaker according to claim 12, wherein a pair of normally open contacts of a limit switch is inserted in a second auxiliary circuit also including said energizing winding of said servo-motor and said source of electric energy, and wherein an actuating mechanism of said limit switch is operatively connected to and acted upon by said servo-motor so that upon effective energization of said reed coil and sufficient vibration of said reed caused by said energization the intermittent closing of said first auxiliary circuit by said pair of reed contacts merely initiates the reclosing step by starting said servo-motor due to initial energization of its winding, whereupon said servo-motor causes said actuating means of said limit switch to uninterruptedly close said pair of limit switch contacts and thereby said second auxiliary circuit including said winding, until said pair of contacts and said second auxiliary circuit are opened by said actuating mechanism of said limit switch and said servo-motor stopped, when said servo-motor has reclosed said main contacts.

14. An automatic electric circuit breaker, comprising in combination, a switch means having a pair of main contacts inserted in a network load circuit to be protected by said circuit breaker, an electromagnet having an armature operatively connected to said switch means and biasing means on said armature to normally hold said pair of main contacts in closed position, a winding on said electromagnet inserted in said network circuit and being responsive to overload or short-circuit currents in said network load circuit so as to displace said armature upon the occurrence of overload and short-circuit currents to separate said pair of main contacts overcoming the biasing force acting on said armature, a holding coil on said electromagnet, a holding circuit of high impedance value including in series said holding coil, a normally closed pair of control contacts, a source of electric energy and said pair of main contacts so that a low current will flow through said holding coil when said main contacts are separated, said low current being sufficiently high to energize said coil to hold said armature attracted and said switch means in open position overcoming the force of said biasing means acting thereupon, a resonance reed having an energizing coil, an auxiliary circuit including a source of periodic electric currents and said energizing coil of said reed, said reed being responsive to the frequency of said periodic electric current source, normally open contact means on said switch means and being adapted to connect said auxiliary circuit to said network load circuit and simultaneously shunting said energizing coil of said reed across said loads upon the opening of said switch means, linking means between said reed and said control contacts operatively connecting said reed and said control contacts so that, when said switch means is open and the impedance in said network load circuit exceeds a predetermined value sufficiently high to permit an effective energization of said energizing coil of said reed causing the latter to vibrate at a predetermined amplitude, said control contacts are opened under the vibrating reed action transmitted to said control contacts via said linking means resulting in opening of said holding circuit and release of said armature to the action of said biasing force causing reclosing of said switch means.

15. An automatic circuit breaker according to claim 14, wherein said linking means constitutes a second auxiliary circuit including a pair of normally open contacts operatively connected with said reed and being adapted to be interruptedly closed, when said reed vibrates at the predetermined amplitude, a source of electric energy and a relay having an energizing winding and an armature, said armature being operatively connected to said control contacts so as to open them upon energization of said relay winding caused by the interrupted closing of said reed contacts.

16. In an automatic electric circuit breaker comprising a main switch having normally closed main contacts connecting a source of electric power to an electric load circuit, overload responsive means adapted to open said main switch upon the occurrence of overload or short-circuit currents in said load circuit, a resonance reed having an energizing coil, auxiliary switch means on said main switch to connect said energizing coil of said reed through an auxiliary circuit in shunt across said loads upon opening of said main contacts, a source of periodic electric currents, means on said main switch to connect said source of periodic electric currents to said load circuit upon the occurrence of overload or short-circuit currents therein, said reed being responsive to the frequency of said periodic electric currents, a reclosing mechanism including actuating means adapted to reclose said main contacts, linking means between said reed and said actuating means of said reclosing mechanism to operatively connect said reed to said actuating means so that upon vibration of said reed at a predetermined amplitude said reed causes said actuating means via said linking means to operate said reclosing mechanism to reclose said main contacts, said source of periodic electric currents having such voltage that an effective energization of said energizing coil to vibrate said reed at the predetermined amplitude takes place only when the main switch is open and the impedance value of said shunted load circuit does not exceed a predetermined value.

17. In an automatic electric circuit breaker according to claim 16, wherein said source of periodic electric currents is an alternating current source.

18. In an automatic electric circuit breaker according to claim 16, wherein said linking means comprises a second auxiliary circuit including a pair of contacts operatively connected with said reed and being adapted to be interruptedly actuated when said reed vibrates at the predetermined amplitude, a source of electric energy and electric releasing means of said actuating means, said releasing means being adapted to be operated upon interrupted actuation of said contacts to cause said actuating means to close main switch.

19. In an automatic electric circuit breaker according to claim 18, wherein said source of electric energy in said second auxiliary circuit is an alternating current source, and wherein said reed is designed and said pair of reed contacts set in such a manner that said alternating current is rectified by and during the interrupted actuation of said reed.

20. In an automatic electric circuit breaker according to claim 18, wherein means are provided on said pair of reed contacts to gradually decrease the sensitivity of operation of said reed after repeated opening and closing said main switch due to continued presence of overload or short circuit currents in said load circuit.

21. In an automatic electric circuit breaker according to claim 18, wherein said contacts of said pair are normally separated from one another and are adapted to become interruptedly engaged to interruptedly close said second auxiliary circuit to actuate said releasing means when said reed vibrates at said predetermined amplitude, and wherein means are provided on said pair of contacts to gradually increase their distance from one another under control of means in said load circuit responsive to repeated opening and closing of said main switch due to continued presence of overload or short circuits.

22. In an automatic electric circuit breaker according to claim 21, wherein said means to gradually decrease the contact distance comprises a cam member associated with one of said reed contacts and a shaft on which said cam member is mounted to be rotated, and wherein said means responsive to repeated actuation of said main switch is a step-by-step mechanism connected to and adapted to be stepwise rotated by said reclosing mechanism upon repeated reclosing operation, said shaft being connected to said reclosing mechanism to be stepwise rotated thereby.

23. In an automatic electric circuit breaker according to claim 21, wherein a time-controlled actuating device is operatively connected to said means to increase the distance between said contacts, said device being adapted to actuate said means upon elapse of a predetermined time interval to return said means and said contacts to their original position.

CHARLES F. PULVARI.

REFERENCES CITED

The following references are of record in the file of this patent:

UNITED STATES PATENTS

| Number | Name | Date |
|---|---|---|
| 1,555,893 | Thompson | Oct. 6, 1925 |
| 1,635,779 | Carter | July 12, 1927 |
| 2,249,870 | Taliaferro | July 22, 1941 |
| 2,504,877 | Reagan | Apr. 18, 1950 |